Feb. 25, 1969     I. W. CENTECK     3,428,963

DECORATIVE COLLAR

Filed Oct. 22, 1965

INVENTOR.
IRENE W. CENTECK

BY

Barnes, Kisselle, Raisch & Choate

ATTORNEYS 3,428,963
DECORATIVE COLLAR
Irene W. Centeck, 1427 S. Renaud, Grosse
Pointe Woods, Mich. 48236
Filed Oct. 22, 1965, Ser. No. 500,509
U.S. Cl. 2—133      4 Claims
Int. Cl. A41b *3/00;* A42b *1/02, 1/04*

ABSTRACT OF THE DISCLOSURE

A removable collar or decorative headband comprising a piece of lace material adapted to be fastened to a garment and a plurality of artificial flowers. A snap fastening element is provided on each flower and a plurality of complementary snap fastening elements are cemented on the piece of lace material so that the flowers are selectively attached to the piece of lace material.

---

This invention relates to decorative collars.

In women's apparel, it is desiarble when practical to provide a removable collar which can modify the styling of the garment, such as the suit or a hat, substantially changing the appearance thereof without excessive cost.

In accordance with the invention, a decorative collar is provided, which consists of a piece of decorative material that can be fastened to the garment as by stitching and a plurality of artificial flowers. Each of the flowers is provided with a snap fastening element and the piece of decorative material is provided with a plurality of complementary snap fastening elements thereon so that the flowers can be selectively arranged on the piece of decorative material and changed as desired to modify the overall appearance of the garment.

Figure 1:
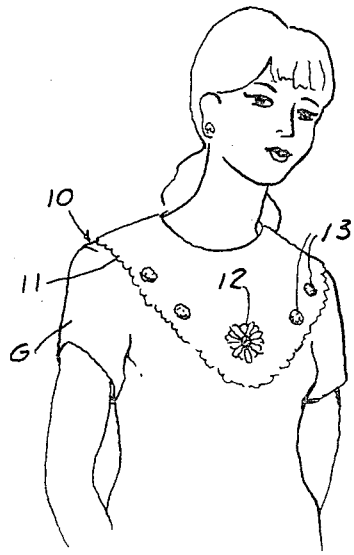
FIGURE 1 is a fragmentary perspective view of a decorative collar involving the invention.

Referring to FIGURE 1, the decorative apparel device is shown as comprising a decorative collar 10, consisting of a piece 11 of decorative material, such as lace, that is adapted to be stitched over the basic garment G. The piece of decorative material 11 is adapted to selectively support a plurality of flowers 12, 13. The flowers 12, 13 have snap fastening elements thereon which cooperate with complementary snap fastener elements on the material 11 so that the flowers can be selectively positioned.

Figure 2:
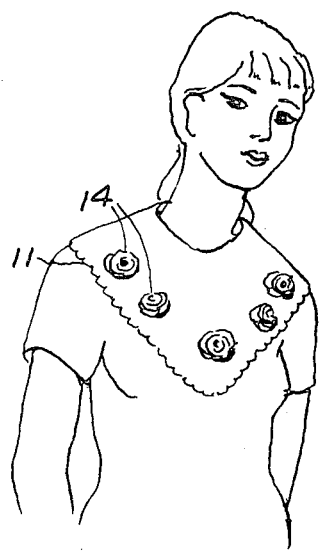
FIGURE 2 is a similar view of a slightly modified flower arrangement.

As shown in FIGURE 2 the flowers may be changed to provide a completely different decorative appearance by removing the flowers 12, 13 and replacing them with flowers 14 of different colors, sizes and shapes.

Figure 4:
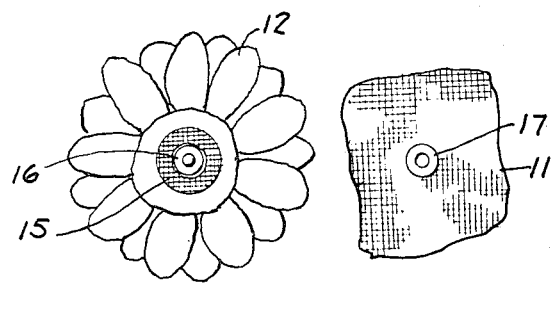
FIGURE 4 is an exploded view of the flower and decorative arrangement.
Figure 5:
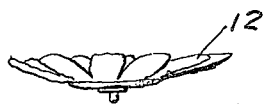
FIGURE 5 is a side elevational view of the flower.
Figure 6:
FIGURE 6 is a side elevational view of a further modified form of flower.

Referring to FIGURE 4, each flower is made of artificial material such as cloth and includes a base mesh 15 to which a snap fastening element 16 is cemented. A complementary snap fastening element 17 is cemented to the base material 11. By this arrangement the flowers can be snapped into position on the base element 11.

Figure 3:
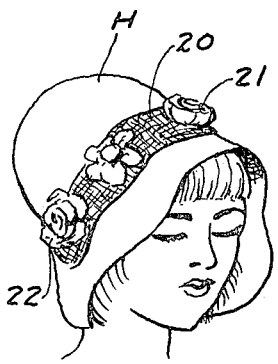
FIGURE 3 is a fragmentary perspective view of a further modified form of decorative apparel.

As shown in FIGURE 3 the piece of decorative material 20 may be provided to conform with the hat H and have removable flowers 21, 22 thereon to provide a selective decorative appearance of the hat.

Figure 8:
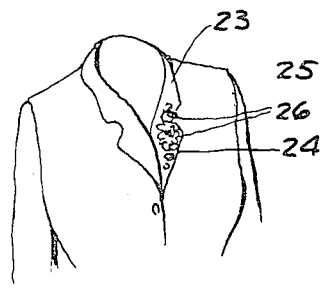
FIGURE 8 is a fragmentary perspective view of a further modified form of the invention.
Figure 7:
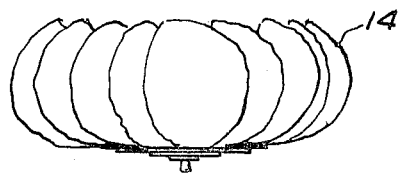
FIGURE 7 is a side view of a further modified form of flower.

As shown in FIGURE 8, the collar 23 can be provided in conformity with the shape and size of the collar 24 of a suit 25. Similarly, the collar 23 is provided with flowers 26 that are removable and replaceable to vary the appearance of the suit.

It can thus be seen that there has been provided a relatively inexpensive decorative device which will change the overall appearance of the article of apparel, with a minimum of effort and expense.

What I claim is:
1. A removable colar comprising,
 a piece of lace material adapted to be fastened to a garment,
 a plurality of artificial flowers,
 a snap fastening element on each of said flowers,
 and a plurality of complementary snap fastening elements cemented on said piece of lace material, said artificial flowers being selectively attached to said piece of lace material.
2. A removable decorative collar comprising,
 a piece of lace material adapted to be fastened to a garment,
 a plurality of artificial flowers,
 a snap fastening element cemented on each of said flowers,
 and a plurality of complementary snap fastening elements cemented on said piece of lace material, said artificial flowers being selectively attached to said piece of lace material.
5. A removable decorative collar comprising,
 a piece of lace material adapted to be fastened to a garment,
 a plurality of artificial flowers,
 a base mesh piece of material,
 a snap fastening element cemented on said base piece,
 an artificial flower fastened to said base piece,
 and a plurality of complementary snap fastening elements cemented on said piece of lace material, said artificial flowers being selectively attached to said piece of lace material.
4. A removable decorative hat band comprisnig,
 a piece of lace material adapted to be fastened to a garment,
 a plurality of artificial flowers,
 a base mesh piece of material,
 a snap fastening element cemented on said base piece,
 an artificial flower fastened to said base piece,
 and a plurality of complementary snap fastening elements cemented on said piece of lace material, said artificial flowers being selectively attached to said piece of lace material.

References Cited

UNITED STATES PATENTS

| D. 118,801 | 1/1940 | Breuss | 2—349 |
| 1,003,895 | 9/1911 | Gasthoff | 161—30 |
| 834,900 | 11/1906 | Glreum | 2—192 |
| 3,127,617 | 4/1964 | Bonzi | 2—133 X |
| 3,179,954 | 4/1965 | Weitzner | 2—180 X |

FOREIGN PATENTS

| 23,174 | 10/1907 | Great Britain. |
| 1,045,064 | 6/1953 | France. |
| 1,313,032 | 11/1962 | France. |

JAMES R. BOLER, *Primary Examiner.*

U.S. Cl. X.R.

2—198